United States Patent
Sieben

(10) Patent No.: US 10,906,648 B2
(45) Date of Patent: Feb. 2, 2021

(54) ARRANGEMENT IN A VEHICLE CABIN WITH CABIN MONUMENTS PLACEABLE IN ROWS WITH LAMINAR CONTACT OF THE LATERAL SURFACES THEREOF

(71) Applicant: Airbus Operations GmbH, Hamburg (DE)

(72) Inventor: Martin Sieben, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 471 days.

(21) Appl. No.: 15/678,325

(22) Filed: Aug. 16, 2017

(65) Prior Publication Data

US 2017/0369170 A1    Dec. 28, 2017

Related U.S. Application Data

(63) Continuation of application No. PCT/EP2016/053466, filed on Feb. 18, 2016.

(30) Foreign Application Priority Data

Feb. 18, 2015 (DE) .................. 10 2015 102 315

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01); *B64D 2011/0046* (2013.01)

(58) Field of Classification Search
CPC ............... B64D 11/0007; B64D 11/04; B64D 2011/0046
See application file for complete search history.

(56) References Cited

U.S. PATENT DOCUMENTS 4,055,317 A    10/1977    Greiss
RE32,176 E  *  6/1986    Vernon .................. A47B 77/02
                                                            186/40
(Continued)

FOREIGN PATENT DOCUMENTS

DE    102009008355 A1    8/2010
DE    102015102315 A1    8/2016
(Continued)

OTHER PUBLICATIONS

International Searching Authority, International Search Report for International Application No. PCT/EP2016/053466 dated Apr. 13, 2016.

*Primary Examiner* — Jessica B Wong
(74) *Attorney, Agent, or Firm* — Nixon & Vanderhye P.C.

(57) ABSTRACT

An arrangement in a cabin of a vehicle has a plurality of cabin monuments, placeable in rows, of which the lateral surfaces are in laminar contact, said cabin monuments having a front side and a rear side and a wall surface of the aircraft fuselage, at least sections of which face toward the cabin of the vehicle and are not aligned parallel with a lengthwise axis of the cabin. The cabin monuments are arranged in rows parallel to the lengthwise axis of the cabin, so that the front sides and the rear sides are each aligned parallel to the lengthwise axis of the cabin. The rear sides of at least two cabin monuments, each of which include storage space for cabin trolleys, are positioned with an offset relative to each other in a direction transverse to the lengthwise axis of the cabin.

9 Claims, 4 Drawing Sheets

(56) References Cited

U.S. PATENT DOCUMENTS

| | | | | |
|---|---|---|---|---|
| 6,003,813 | A * | 12/1999 | Wentland | B64D 11/00 244/118.5 |
| 6,073,883 | A * | 6/2000 | Ohlmann | B64D 11/00 105/316 |
| 8,672,267 | B2 | 3/2014 | Schliwa et al. | |
| 9,738,387 | B2 * | 8/2017 | Holtorf | B64D 11/04 |
| 2003/0029967 | A1 * | 2/2003 | Mills | B64D 11/00 244/118.5 |
| 2003/0189132 | A1 * | 10/2003 | Brady | B60H 1/00 244/118.5 |
| 2007/0018046 | A1 | 1/2007 | Boren | |
| 2009/0261200 | A1 * | 10/2009 | Saint-Jalmes | B64D 11/04 244/118.5 |
| 2016/0009395 | A1 * | 1/2016 | Savian | B64D 11/02 244/118.5 |

FOREIGN PATENT DOCUMENTS

| | | |
|---|---|---|
| EP | 2460727 A2 | 6/2012 |
| EP | 2536630 A2 | 12/2012 |
| FR | 2941917 A1 | 8/2010 |
| WO | 2016131922 A1 | 8/2016 |

* cited by examiner

ARRANGEMENT IN A VEHICLE CABIN WITH CABIN MONUMENTS PLACEABLE IN ROWS WITH LAMINAR CONTACT OF THE LATERAL SURFACES THEREOF

CROSS-REFERENCE TO RELATED APPLICATION(S)

This application is a continuation of international patent application number PCT/EP2016/053466, having an international filing date of Feb. 18, 2016, which claims priority to German patent application number 10 2015 102 315.6, having a filing date of Feb. 18, 2015. Both of these referenced applications are incorporated by reference herein.

TECHNICAL FIELD

Embodiments of the invention relate to an arrangement in a vehicle cabin and particularly an aircraft, and a vehicle, particularly an aircraft, including at least one such arrangement.

BACKGROUND

Cabins in vehicles, and particularly in aircraft, are designed according to specific criteria, and besides a desired number of passenger seats they also include fittings that serve to enhance comfort in the cabin or raise awareness of safety-critical functions. These may include toilets, kitchen modules and the like, which are arranged for example close to doors and in an area created in the rear of the cabin. Particularly when designing passenger cabins for an aircraft, it is important to create a product that is lightweight yet fulfils many functions, in order to optimize the efficiency of the aircraft. This requires that the fittings be arranged in a highly space saving manner, which may also include creating multifunctional fittings. One possible objective may be considered to be the provision of as many functions for ensuring the comfort or safety of all passengers as possible within the smallest possible space inside the passenger cabin.

A monument for an aircraft cabin that is assembled from modules and extends transversely to a lengthwise direction of the cabin directly in front of a pressure bulkhead of the aircraft fuselage is disclosed in European patent document EP 2536630 A2, for example.

BRIEF SUMMARY

It may be considered an object of the disclosed subject matter to create an alternative arrangement in a cabin of a vehicle, in which the most effective, most efficient use is made of the available space, particularly in a rear area of an aircraft.

An arrangement in a vehicle cabin is suggested, which arrangement includes a plurality of cabin monuments, placeable in rows, of which the lateral surfaces are in laminar contact, or almost in laminar contact to compensate for any relative movements, said cabin monuments having a front side and a rear side and a wall surface of the aircraft fuselage which faces toward the cabin and at least sections of which are not aligned parallel with a lengthwise axis of the cabin, wherein the cabin monuments are arranged in rows parallel to the lengthwise axis of the cabin, so that the front sides and the rear sides are each aligned parallel to the lengthwise axis of the cabin, and wherein the rear sides and/or the front sides of at least two cabin monuments, each of which include storage space for cabin trolleys are positioned with an offset relative to each other in a direction transverse to the lengthwise axis of the cabin.

The term cabin monument is understood to mean a structure that particularly has a housing that encloses a useful space, with lateral surfaces, a front side and a rear side, in which at least one dedicated general function for the passenger cabin is provided. The housing does not necessarily have to include closed delimiting surfaces, it would be sufficient of at least one enclosed space and the surfaces delimiting such space were clearly defined, which is also possible with a frame construction or similar.

The cabin monument usually stands on a cabin floor, where it is anchored in a desired position, and it extends from there toward the cabin ceiling. Some monuments may indeed reach as far as the ceiling but others are not so tall. For example, the at least one cabin monument may be a galley monument, a toilet monument, a washroom, a changing room, a sleeping compartment, a stowage compartment or any combination of two or more of such monuments in a multifunctional, module-based assembly. The cabin monument may also be considered as the smallest unit of a group of cabin monuments, which offers only the function of providing a storage space, for example.

The fuselage wall to which the arrangement is attached and/or against which it lies in close alignment, delimits the spatial extension of the arrangement transversely to the lengthwise axis of the cabin, which approximately coincides with the lengthwise axis of the vehicle. The arrangement is capable of compensating for discontinuities and/or a slanted course between the fuselage wall and the lengthwise axis of the cabin, and still enable efficient use of the space.

A stepped arrangement of the rear sides of the cabin monuments enables the use of cabin monuments with a rectilinear profile that is aligned strictly with the lengthwise axis of the cabin. A stepped arrangement of the rear sides enables incremental approximation of a contour facing away from the cabin to the fuselage wall, for example. The contour of the fronts of the arrangement perceived in the cabin may be largely independent of these depending on the cabin monuments used. As the distance between the lengthwise axis of the cabin and the fuselage wall increases, better use may be made of the space either by the cabin monuments or by the free space between the front of the arrangement and the lengthwise axis of the cabin.

In an advantageous embodiment, the cabin monuments have the same construction depth, and at least sections of the rear sides are arranged flush with the surface of the fuselage wall facing toward the cabin. In this way, the front sides and the rear sides of the individual cabin monuments are arranged in rows side by side in a stepped or incremented manner because at least portions of the fuselage wall are not parallel with the lengthwise axis of the cabin. As the distance between the fuselage wall and the lengthwise axis of the cabin increases, a sloping fuselage wall means that more and more space may become available for taking hold of the cabin monuments.

Moreover, at least two front sides may be offset relative to each other in a direction transverse to the lengthwise axis of the cabin. In this context, the offset depends on the construction depth and contour of the fuselage wall, and may be chosen according to the function of the cabin monument in question. A cabin monument of a series of consecutive cabin monuments facing a passenger area may be designed such that a following cabin monument in a direction facing away from the passenger area has a front side that is arranged closer to the lengthwise axis of the cabin.

In an equally advantageous embodiment, at least two cabin monuments may have different construction depths, and at least portions of the rear sides of the cabin monuments are arranged flush with the surface of the fuselage wall facing the cabin. The front sides of the cabin monuments may extend in a common plane. A flat front is produced from the plurality of cabin monuments. The construction depths of the individual cabin monuments may then vary so that the distance between the fuselage wall and the lengthwise axis of the cabin is used as efficiently as possible.

The aforementioned embodiments may be located in an area of the cabin in which the fuselage wall does not extends in the same direction as the lengthwise axis of the cabin. This applies for a rear area of an aircraft, for example, in which a pressure bulkhead is arranged and in which the width of the fuselages becomes narrower toward the rear.

However, the surface of the fuselage wall may also include reinforcing elements that protrude into the cabin. This may apply not only for a sloping fuselage wall but also a fuselage wall that is parallel to the lengthwise axis of the cabin, which occurs in a cylindrical area of an aircraft fuselage, for example.

The construction depths of the cabin monuments may be graduated in a grid pattern, which is formed by available sizes of transportable cabin trolleys. Consequently, the construction depths are each graduated for transporting at least one cabin trolley of an available size, which may also comprise a combination of multiple cabin trolleys which may be of different sizes or the same size.

An exemplary embodiment of the invention further relates to a vehicle having a cabin and at least one arrangement positioned therein and having the aforementioned features. The vehicle is particularly a commercial airliner with a large number of passenger seats.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and application options of the disclosed subject matter will be evident from the following description of embodiments and the figures. Identical or similar objects are also designated by the same reference signs in all of the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
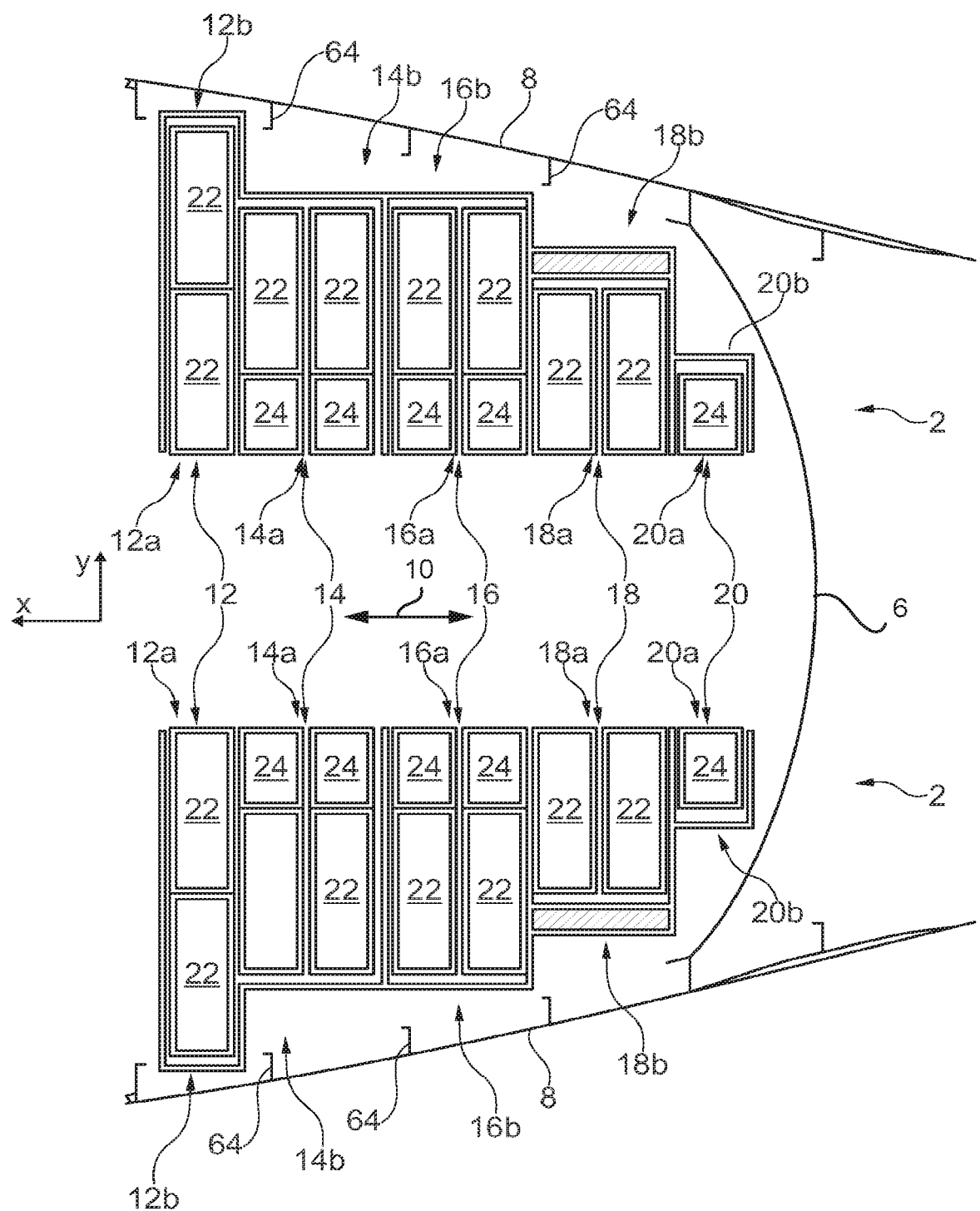
FIGS. 1 to 4 each show diagrammatic representations of an arrangement in plan view.

FIG. 1 shows a first embodiment of an arrangement 2 in an aircraft cabin 4, more precisely in a rear area, in which a pressure bulkhead 6 is positioned to seal a pressurized fuselage. In this area, a fuselage wall 8 is arranged and extends at an angle to a lengthwise axis of the cabin 10. In a lengthwise direction x defined thereby, the distance between fuselage wall 8 and the lengthwise axis of the cabin 10 thus increases continually until a purely cylindrical area of the fuselage is reached, at which point the distance remains constant. However, discontinuities can exist over the length of fuselage wall 8, caused by reinforcing elements and the like.

Arrangement 2 includes a plurality of cabin monuments 12, 14, 16, 18 and 20, which are arranged in rows in 1 in lengthwise direction x, so that the lateral surfaces thereof touch each other. Arrangement 2 is also replicated symmetrically, meaning that such an arrangement 2 can be found on both sides of the lengthwise axis of cabin 10.

Each cabin monument 12 to 20 has a front side 12a, 14a, 16a, 18a and 20a as well as a rear side 12b, 14b, 16b, 18b and 20b facing toward fuselage wall 8. As hinted in FIG. 1, rear sides 20b are arranged as closely as possible to fuselage wall 8. In this way, for example, enough storage spaces are created in cabin monument 12 to accommodate two full-size cabin trolleys 22, while in cabin monuments 14 and 16 two storage spaces for full-size cabin trolleys 22 and two storage spaces for half-size cabin trolleys 24 are provided. Cabin monument 18 may include storage spaces for two full-size cabin trolleys 22, cabin monument 20 may have a storage space for one half-size cabin trolley 24. The groups of cabin monuments 12, 14 and 16, 18 and 20 are used with graduated construction depths, which is adapted to an installation space that is dictated by the fuselage wall 8 in order to maintain an even, flat front of arrangement 2.

Figure 2:
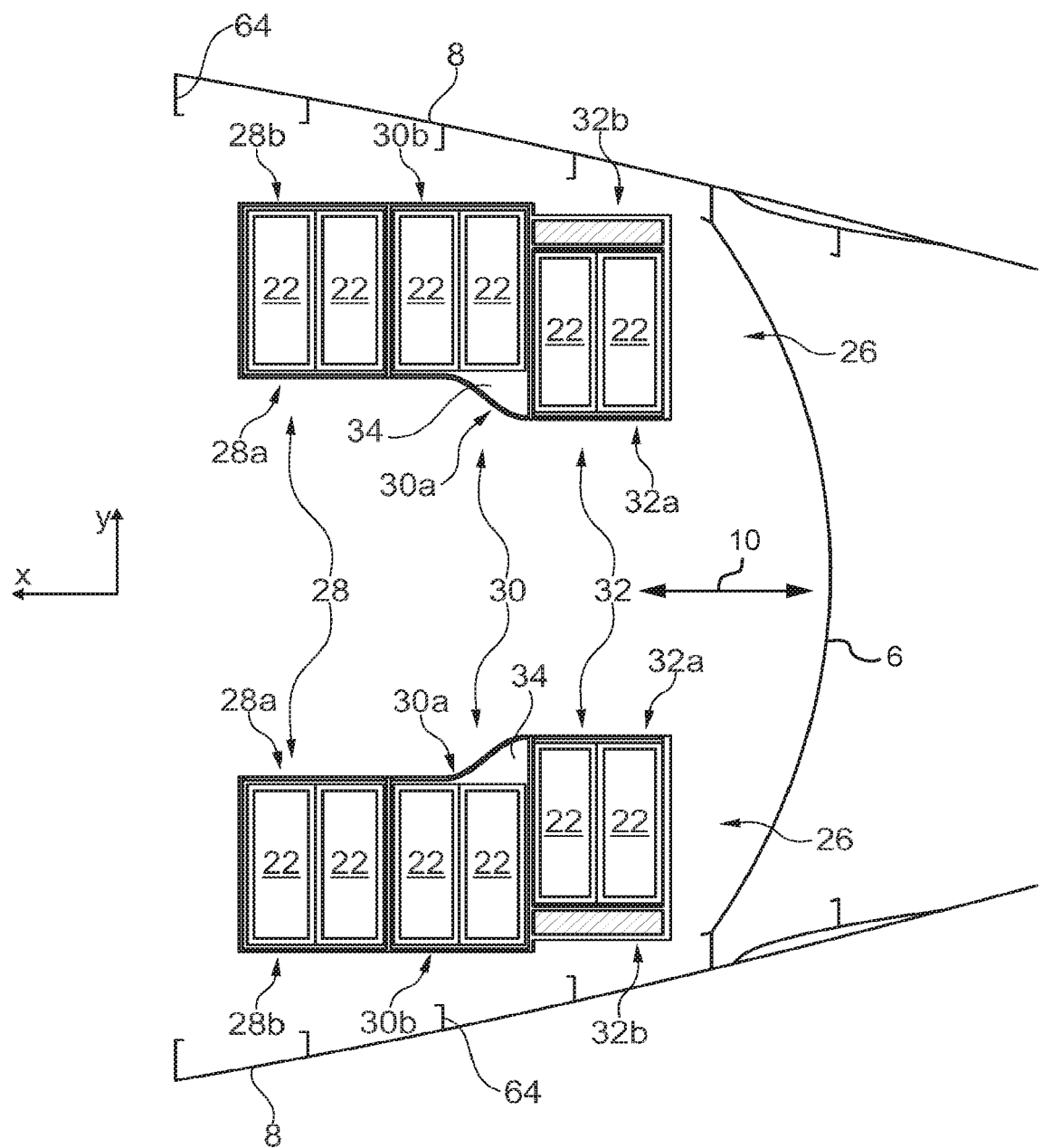

FIG. 2 shows a modified arrangement 26 with cabin monuments 28, 30 and 32, which are arranged side by side in lengthwise direction x. One special feature consists in the cabin monuments 28 and 30 have the same construction depth, while cabin monument 32 is offset in the y-direction, i.e., transversely to the lengthwise direction x. A work surface 34 facing away from fuselage wall 8 forms a continuous transition from cabin monument 30 to cabin monument 32. In this arrangement 26, a gap 36 may form between rear sides 28b and 30b and the fuselage wall 8, and this might be obscured by a covering (not shown) or filled with smaller, lockable storage compartments. FIG. 2 also shows a configuration in which only the front sides 30a, 32a of the cabin monuments 30, 32 are offset with respect to each other and the rear sides 30b, 32c of the cabin monuments 30, 32 are not offset to each other. In other words, it is possible that only front sides 28a, 30a, 32a of the cabin monuments 28, 30, 32 comprise offsets with respect to each other whereas rear sides 28b, 30b, 32b are aligned with each other. This configuration provides advantages concerning force introduction and transmission. However, in case of an alignment of the rear sides 28b, 30b, 32b of the monuments 28, 30, 32, there is still enough space for system connections.

Figure 3:
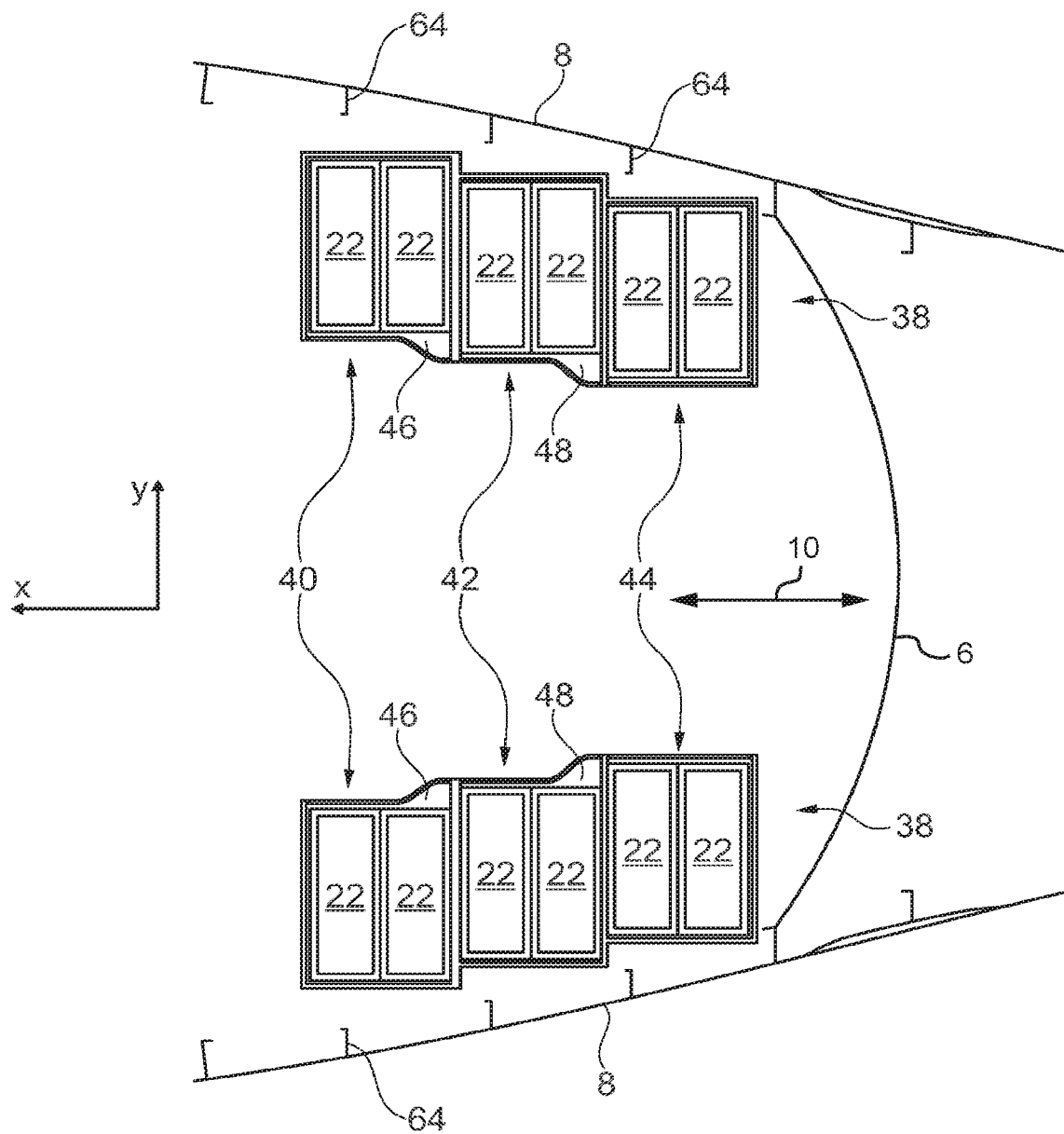

A further refinement of this design is shown in FIG. 3 with the arrangement 38 illustrated there. In this case, three cabin monuments 40, 42 and 44 of the same type are offset in the y-direction with respect to each other and are positioned at the smallest possible distance from fuselage wall 8. Thus, two transition areas 46 and 48 are created so that the differences in width can be managed as smoothly as possible.

Figure 4:
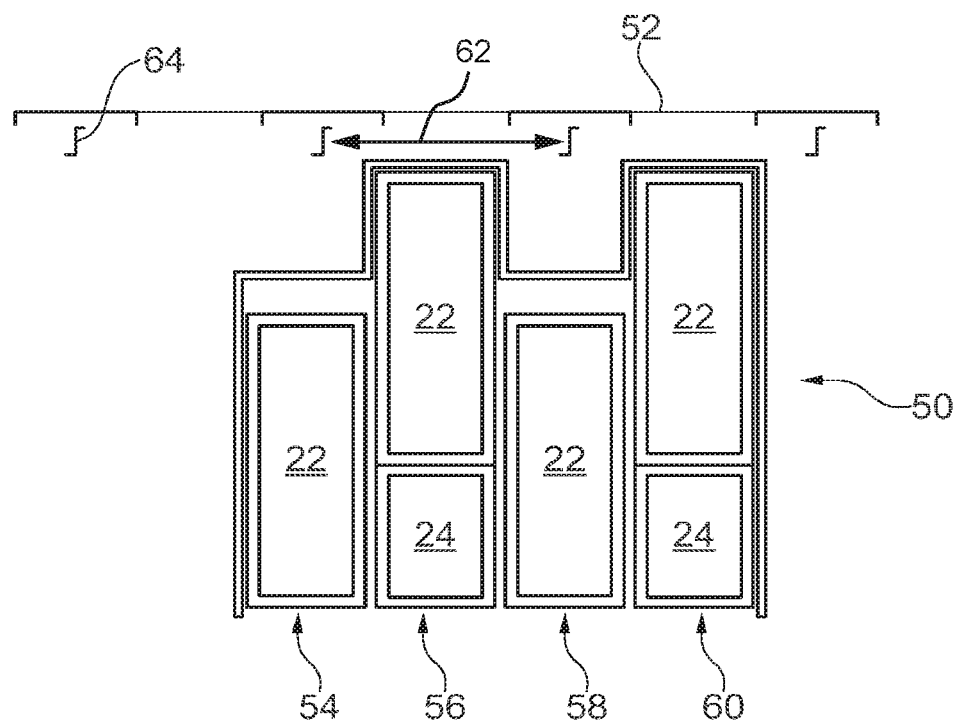

Finally, FIG. 4 shows an arrangement 50 in an essentially cylindrical area of a fuselage wall 52, with a plurality of cabin monuments 54, 56, 58 and 60 arranged in rows, that is to say consecutively in the x-direction, and which have alternating depths. The depth can vary in order to increase space available for electric equipment/wiring. The widths of the cabin monuments are selected so they are correlated with a frame distance 62 in such a way that deeper cabin monuments 56 and 60 extend between reinforcing components 64 produced in the form of a framework and intended to stiffen the fuselage, whereas a little lower down cabin monuments 54 and 58 are set apart from the framework.

It should be noted in addition that the term "include" does not exclude other elements or steps, and "one" does not preclude a plurality. It should further be noted that features which have been described with reference to one of the aforementioned embodiments can also be used in combination with other features of other embodiments that have also been described in the preceding text. Reference signs in the claims are not to be construed as a limitation thereof.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An arrangement in a cabin of a vehicle, the arrangement comprising:
    a plurality of galley cabin monuments arranged in a row such that at least one lateral surface on each of the galley cabin monuments is adjacent the lateral surface of an adjacent one of the galley cabin monuments, wherein each of the galley cabin monuments includes a front side and a rear side, and the lateral surfaces are between the front side and the rear side; and
    a surface of a fuselage wall of the vehicle, wherein at least portions of the surface of the fuselage wall are not parallel to a lengthwise axis of the cabin and face the cabin;
    wherein the row of the galley cabin monuments is parallel to the lengthwise axis of the cabin, so that the front sides and rear sides extend parallel to the lengthwise axis of the cabin;
    wherein the galley cabin monuments are aligned with the at least the portion of the surface of the fuselage wall;
    wherein the rear sides of the galley cabin monuments face and are adjacent the portion of the surface of the fuselage;
    wherein the rear sides of at least two of the galley cabin monuments are offset, in a direction perpendicular to the lengthwise axis, and the rear sides of the at least two of the gallery cabin monuments are connected by one of the lateral surfaces of one of the at least two of the gallery cabin monuments;
    wherein the rear sides of the galley monuments in the row and portions of at least some of the lateral surfaces form a stairstep shape in which the rear sides are parallel to the lengthwise axis and the portions of the at least some of the lateral surfaces are perpendicular to the lengthwise axis, and
    wherein each of the galley cabin monuments includes a storage space for at least two cabin trolleys.

2. The arrangement of claim 1, wherein the galley cabin monuments have the same construction depth, and at least portions of the rear sides are arranged flush against the surface of the fuselage wall facing toward the cabin.

3. The arrangement of claim 2, wherein at least two front sides are offset relative to each other in a direction extending transversely to the lengthwise axis of the cabin.

4. The arrangement of claim 1, wherein the front sides of at least two of the galley cabin monuments extend in a common plane.

5. The arrangement of claim 1, wherein the fuselage wall extends at an angle to the lengthwise axis of the cabin.

6. The arrangement of claim 1, wherein the surface of the fuselage wall includes reinforcing elements which protrude into the cabin, and the rear side of one of the galley cabin monuments is between the reinforcing elements along a direction parallel to the lengthwise axis of the cabin.

7. A vehicle including a cabin with at least one arrangement comprising:
    a plurality of galley cabin monuments arranged in a row and in laminar contact with each other via lateral surfaces of the galley cabin monuments, wherein each of the galley cabin monuments have a front side and a rear side; and
    a surface of a fuselage wall of the vehicle, at least a portion of the surface is not parallel to a lengthwise axis of the cabin and the at least the portion of the surface faces and is adjacent the rear sides of the galley cabin monuments,
    wherein the row of the galley cabin monuments is parallel to the lengthwise axis of the cabin, so that the front sides and rear sides of each of the galley cabin monuments are parallel to the lengthwise axis of the cabin,
    wherein the rear sides of at least two of the galley cabin monuments are offset, in a direction perpendicular to the lengthwise axis, and the rear sides of the at least two of the gallery cabin monuments are connected by one of the lateral surfaces of one of the at least two of the gallery cabin monuments;
    wherein the rear sides of the galley cabin monuments in the row and portions of at least some of the lateral surfaces form a stairstep shape in which the rear sides are parallel to the lengthwise axis and the portions of the at least some of the lateral surfaces are perpendicular to the lengthwise axis; and
    wherein each of the galley cabin monuments includes at least one storage space for at least two cabin trolleys.

8. The arrangement of claim 1, wherein the lateral surfaces of each of the plurality of cabin monuments are sidewalls spanning between the front side and the rear side of the respective cabin monument.

9. The vehicle of claim 7, wherein the lateral surfaces of each of the plurality of cabin monuments are sidewalls spanning between the front side and the rear side of the respective cabin monument.

* * * * *